(12) United States Patent
Slifer

(10) Patent No.: US 10,216,760 B2
(45) Date of Patent: *Feb. 26, 2019

(54) GEOSPATIAL AND TEMPORAL DATA SYSTEM

(71) Applicant: Doris Mavis LLC, Edina, MN (US)

(72) Inventor: Russell D. Slifer, Boise, ID (US)

(73) Assignee: Doris Mavis LLC, Edina, MN (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/672,911

(22) Filed: Aug. 9, 2017

(65) Prior Publication Data

US 2017/0351704 A1 Dec. 7, 2017

Related U.S. Application Data

(63) Continuation of application No. 14/082,323, filed on Nov. 18, 2013, now Pat. No. 9,760,580, which is a continuation of application No. 13/794,056, filed on Mar. 11, 2013, now abandoned.

(51) Int. Cl.
*G06F 7/00* (2006.01)
*G06F 17/30* (2006.01)

(52) U.S. Cl.
CPC .... *G06F 17/30241* (2013.01); *G06F 17/3087* (2013.01)

(58) Field of Classification Search
CPC ........... G06F 17/3087; G06F 17/30241; G06F 17/3071
USPC ................................ 707/706, 708, 725, 737
See application file for complete search history.

(56) References Cited

U.S. PATENT DOCUMENTS

| | | | |
|---|---|---|---|
| 8,131,702 B1 | 3/2012 | Bharat et al. | |
| 2007/0083323 A1 | 4/2007 | Rosenberg | |
| 2008/0182587 A1 | 7/2008 | Bennett | |
| 2009/0177988 A1* | 7/2009 | Martins | G06F 17/30398 715/764 |
| 2012/0290978 A1 | 11/2012 | Devecka | |
| 2013/0091113 A1 | 4/2013 | Gras | |
| 2014/0258269 A1 | 9/2014 | Slifer | |

FOREIGN PATENT DOCUMENTS

GB 2500766 A 10/2013

OTHER PUBLICATIONS

"U.S. Appl. No. 14/082,323, Advisory Action dated Aug. 12, 2016", 4 pgs.

(Continued)

*Primary Examiner* — Md I Uddin
(74) *Attorney, Agent, or Firm* — Schwegman Lundberg & Woessner, P.A.

(57) ABSTRACT

A system is described that a geospatial coordinate component arranged to identify a set of geospatial coordinates from a geospatial dataset. A temporal coordinate component is arranged to identify a set of temporal coordinates from a temporal dataset. The system includes an article query component that is arranged to determine a set of articles based on the set of geospatial coordinates and the set of temporal coordinates. A presentation component is arranged to present a representation of a member of the set of articles. The geospatial coordinate component can receive a user selected geographical area and intersect the geospatial dataset with the geographical area.

19 Claims, 1 Drawing Sheet

(56) References Cited

OTHER PUBLICATIONS

"U.S. Appl. No. 14/082,323, Examiner Interview Summary dated Apr. 2, 2014", 4 pgs.
"U.S. Appl. No. 14/082,323, Final Office Action dated Feb. 2, 2016", 10 pgs.
"U.S. Appl. No. 14/082,323, Final Office Action dated Jun. 30, 2014", 11 pgs.
"U.S. Appl. No. 14/082,323, Non Final Office Action dated Feb. 4, 2014", 10 pgs.
"U.S. Appl. No. 14/082,323, Non Final Office Action dated Apr. 23, 2015", 9 pgs.
"U.S. Appl. No. 14/082,323, Non Final Office Action dated Dec. 29, 2016", 11 pgs.
"U.S. Appl. No. 14/082,323, Notice of Allowance dated May 18, 2017", 16 pgs.
"U.S. Appl. No. 14/082,323, Response filed Apr. 1, 2014 to Non Final Office Action dated Feb. 4, 2014", 10 pgs.
"U.S. Appl. No. 14/082,323, Response filed May 1, 2017 to Non Final Office Action dated Dec. 29, 2016", 11 pgs.
"U.S. Appl. No. 14/082,323, Response filed Jul. 5, 2016 to Final Office Action dated Feb. 2, 2016", 12 pgs.
"U.S. Appl. No. 14/082,323, Response filed Oct. 23, 2015 to Non Final Office Action dated Apr. 23, 2015", 12 pgs.
"U.S. Appl. No. 14/082,323, Response filed Dec. 29, 2014 to Final Office Action dated Jun. 30, 2014", 13 pgs.

* cited by examiner

GEOSPATIAL AND TEMPORAL DATA SYSTEM

This application claims priority to pending U.S. application Ser. No. 14/082,323 filed Nov. 18, 2013, which claims the benefit of priority to U.S. application Ser. No. 13/794,056 filed Mar. 11, 2013, all of which are incorporated herein by reference in their entirety.

BACKGROUND OF THE INVENTION

Global geospatial coordinate formats are well known and heavily used to identify a global position. The Global Positioning System (GPS) is a space-based satellite navigation system that provides location anywhere on or near the Earth where there is an unobstructed line of sight to GPS satellites. The system provides critical capabilities to military, civil and commercial users around the world. It is maintained by the United States government and is freely accessible to anyone with a GPS receiver.

The ability to accurately determine a location relative to known global positioning coordinates enables access to relative information such as mapping and business locations. For example, mobile mapping global positioning systems display current location relative to street maps, suggest a route to a destination, calculate a time of arrival and allow a user to locate areas of interest relative to the current geospatial position of the device.

A point of interest (POI) is specified by the latitude and longitude of the POI, assuming a certain map datum. For example, a POI may have its latitude and longitude representative in units of degrees with decimals such that its GPS Position is: 57 deg 38' 56.83" N, 10 deg 24" 26.79" E. Geo tagging is the process of adding geographical identification metadata to various media such as a photograph or video, websites, SMS messages, or RSS feeds and is a form of geospatial metadata. This data usually consists of latitude and longitude coordinates, though they can also include altitude, bearing, distance, accuracy data, and place names.

Historical records have been traditionally presented based on subject, event and/or time. Easily accessed database resources operate on the assumption that a user has a known subject to be researched. Likewise, historical texts and databases are resources available once a topic of interest has been identified. Unfortunately a large amount of historical data has been essentially lost or not readily available because it is not easily associated with general areas of interest. Improved systems, methods and data structures are needed to provide temporal data.

BRIEF DESCRIPTION OF THE DRAWINGS

The figures illustrate generally, by way of example, but not by way of limitation, various embodiments and examples discussed in the present document.

DETAILED DESCRIPTION OF THE INVENTION

Figure 1:
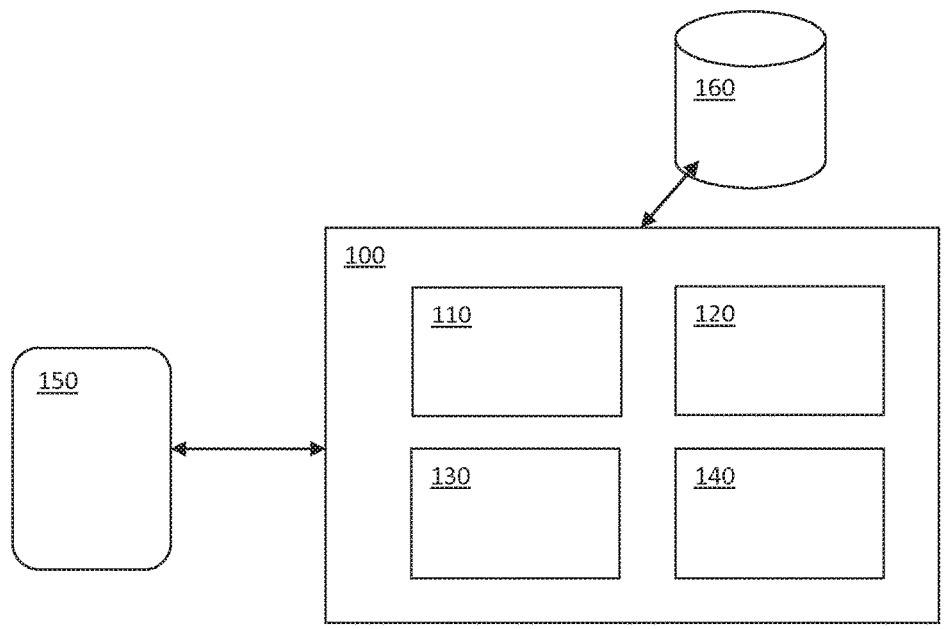
FIG. 1 illustrates a system embodiment of the present invention.

Embodiments of the present invention include systems and methods that provide historic data based on Z-axis temporal coordinates and/or geospatial coordinates. A system is described that associates historical data with geospatial coordinates to enable systems and methods in which the historical data can be accessed based on a defined set of geospatial coordinate(s). The Z-axis temporal coordinates can be selected in varying degrees of time granularity or period. Likewise, the historic data can be filtered based upon numerous criterions, such as subject matter. A defined set of geospatial coordinates can be one specific geospatial coordinate, a series of geospatial coordinates, a defined geospatial radius or selectable geographic region, such as a city. The historic data for neighboring geospatial coordinates within the defined set of geospatial coordinates is accessed together.

The geospatial coordinate system is basically an X-Y axis system using latitude and longitude. While some coordinate systems can add altitude to more specifically define the spatial coordinates of a location, embodiments of the present invention provide a temporal Z-axis coordinate system for use with geospatial coordinates. By coupling historic data to specific geospatial locations and allowing users to access this data based on geospatial coordinates, a plethora of historic data can be more readily accessed.

As explained in detail below, a system embodiment of the invention includes a geospatial coordinate component arranged to identify a set of geospatial coordinates from a geospatial dataset, a temporal coordinate component arranged to identify a set of temporal coordinates from a temporal dataset, an article query component arranged to determine a set of articles based on the set of geospatial coordinates and the set of temporal coordinates, and a presentation component arranged to present a representation of a member of the set of articles. The geospatial coordinate component can receive a user selected geographical area and intersect the geospatial dataset with the geographical area. The system can include one or more processors executing software to arrange the processors to perform the functions of the geospatial coordinate component, temporal coordinate component, article query component and/or the presentation component. Local or remote storage devices can be provided in the system to store the geospatial dataset, the temporal dataset and articles.

The geospatial coordinate component, temporal coordinate component, article query component and the presentation component can be hardware that may be temporarily or permanently configured. Temporary configuration may be accomplished via software. Further, the temporarily configured hardware may comprise different components at different points in time. The geospatial coordinate component, temporal coordinate component, article query component and the presentation components may be provided in common hardware or in a distributed hardware system such as a network or remotely located hardware. A user can access the system using a mobile device, or in some embodiments a stationary device, to provide a geographic point of interest, user criterion for temporal coordinates and display representations of a member of the set of articles.

FIG. 1 illustrates a system embodiment of the present invention. The system 100 includes a geospatial coordinate component 110, temporal coordinate component 120, article query component 130 and a presentation component 140. The system can be accessed by a user via a remote communication device 150, such as a mobile device or computer. One or more storage devices 160 are included in the system, or used by the system, to store historic data, referred to herein as articles. Articles are not limited to text but can include any type, or combination, of data, including text, images, audio and video. The storage device(s) can also be used to store the geospatial and temporal datasets if needed.

The communication device can be configured to provide user specific data to the system and configured to display articles and article representations provided by the system. For example, the communication device can provide a geospatial coordinate (or set of coordinates) of interest, provide a set of temporal coordinates of interest and/or define criterion for filtering articles that the system presents to the user.

In operation, the geospatial coordinate component can identify a set of geospatial coordinates from a geospatial dataset. For example, using a longitude and latitude based geospatial dataset a set of geospatial coordinates can be selected for an area of interest. The temporal coordinate component can identify a set of temporal coordinates from a temporal dataset. The temporal dataset can comprise all of time from the formation of earth. The set of temporal coordinates can be defined by the system or the user. That is, the temporal coordinate component can identify a predetermined set, identify a coordinate set as a suggestion to the user or identify a set based on user criterion. As explained below, the granularity of the set of temporal coordinates can be varied. The system determines, using a hardware processor, a set of articles based on the set of geospatial coordinates and the set of temporal coordinates. A representation of a member of the set of articles is presented to the user.

One communication device 150 can be a mobile device. The mobile device can be, for example, a handheld computer, a cellular telephone, a network appliance, a smart phone, a navigation device, a game console, a computer or other device or a combination of any two or more of these data processing devices or other data processing devices. In one embodiment the mobile device is part of an automobile or transportation device.

In some embodiments, the mobile device includes a touch-sensitive display. The touch-sensitive display can implement liquid crystal display (LCD) technology, light emitting polymer display (LPD) technology, or some other display technology. The touch-sensitive display can be sensitive to haptic and/or tactile contact with a user.

In some embodiments, the touch-sensitive display can comprise a multi-touch-sensitive display. A multi-touch-sensitive display can, for example, process multiple simultaneous touch points, including processing data related to the pressure, degree and/or position of each touch point. Other touch-sensitive display technologies can also be used, e.g., a display in which contact is made using a stylus or other pointing device.

The mobile device can communicate over one or more wired and/or wireless networks in data communication with the system 100. The mobile device can include a memory, one or more data processors, image processors and/or central processing units, and a peripherals interface. The memory interface, the one or more processors and/or the peripherals interface can be separate components or can be integrated in one or more integrated circuits. The mobile device can be configured to execute software code stored at least partially in the memory and interface with the system 100 in response to communications from the mobile device.

In some embodiments, upon start of device functionality, the graphical user interface of the mobile device changes is augmented or replaced with another user interface or user interface elements, to facilitate user access to particular functions associated with the corresponding device functionality.

Figure 2:
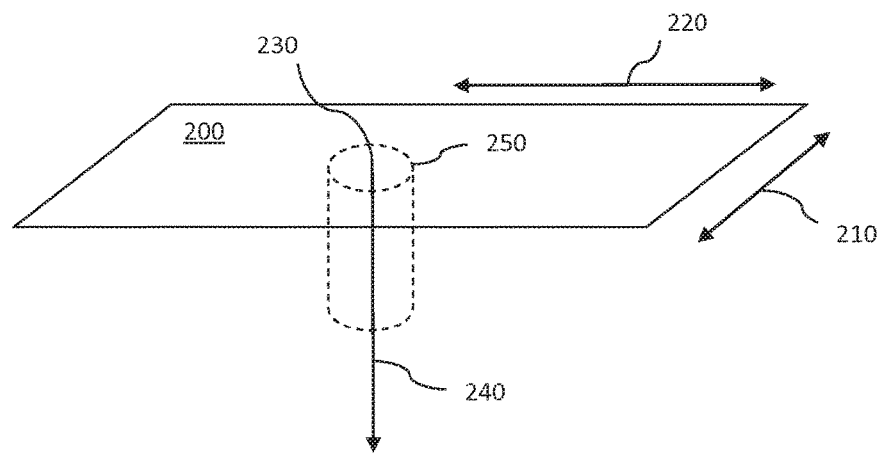
FIG. 2 illustrates a representation of a portion of Earth's surface.

Referring to FIG. 2, a representation of a portion of Earth's surface 200 is provided. The surface is represented by a geospatial coordinate system (latitude 210, longitude 220) of a geographic dataset. A user specified point of interest (POI) 230 has a corresponding geospatial coordinate and is located within the geospatial coordinate system. The POI can be specified using a GPS device physically located at the POI. That is, a mobile device containing a GPS location capability can be activated to identify its current geospatial coordinates. In another embodiment, the POI can be identified using a computer while a user interacts with a mapping system. If a single POI is specified, then the set of geospatial coordinates is considered a set of one coordinate point. In another embodiment, the user can provide data to identify a larger set of geospatial coordinates by selecting a geographic radius about the POI. Likewise, landmarks can be selected to identify the set of geospatial coordinates. For example political entities such a city, county, neighborhood or state could be selected by the user so the system can identify a corresponding set of geospatial coordinates.

In one embodiment the geospatial coordinate component is arranged to receive a user selected point-of-interest, the point-of-interest being within a geographical area. The geographic area can be a geometric shape, such as a circle. Further the point-of-interest can be at the center of the geometric shape. The geospatial coordinate component can be arranged to receive a user selected dimension of the geometric shape such as a radius of a circle. Alternatively, the geographical area may be a predefined area such as a political entity or a landmark. Based on the geometric shape and location the geospatial coordinate component can identify a set of geospatial coordinates from a geospatial dataset.

As illustrated in FIG. 2, temporal coordinate system 240 is provided along a z-axis. Temporal coordinates along the z-axis may have data associated therewith documenting historic events that happened at, or near, a geospatial coordinate. In FIG. 2, a set of geospatial coordinates identified by a geographic circle 250 with radius about POI 230. For example, the center of the circle can be considered a current geospatial location of a user and the radius of the circle represents some geographic distance from the user. The radius can be variable and user defined to increase or decrease in size.

Historic events are typically not limited to one geospatial coordinate. Thus, articles for temporal data may be associated with a range of geospatial coordinates applicable to the granularity of the historic event. For Example, in US history the battle of Gettysburg was fought Jul. 1-3, 1863, in and around the town of Gettysburg, Pa. Articles of the battle can be associated with a temporal coordinate of 1863 (assuming a Gregorian calendar) and geospatial coordinate set corresponding to the location of Gettysburg. Specific articles of the battle, however, can be associated with smaller coordinate sets. For example, on the third day of battle, Jul. 3, 1863, an infantry assault by Confederates against the center of the Union line occurred on Cemetery Ridge, known as Picketts Charge. Articles specific to details of Pickett's Charge could be limited to the geospatial coordinate set associated with Cemetery Ridge.

Articles based on the set of geospatial coordinates and the set of temporal coordinates can be selected from an article dataset. Representations of the articles can be presented to the user so that the user can select which article(s) are of interest. Further, the user can reduce the articles presented with user based criterion such as a user preference, a user identified interest, an inferred user interest, or a user selected temporal range.

Multiple ways are provided for identifying a geospatial coordinate set from a geospatial dataset. The coordinate set can be identified based on their current or past geospatial position of a user. For example, a user can access articles using a geospatial coordinate set identified by their current real time position or a stored geospatial position in which they previously visited. The geospatial coordinate set can be identified using multiple coordinates that are selected by a user. As explained above, such sets can be identified from a geometric pattern, such as a circle centered about a geospatial coordinate, or a set of coordinates within a predefined boundary. The geospatial coordinate set can include contiguous and non-contiguous coordinates. For example, multiple coordinate sets can be identified in a city such that articles associated with any one, or all, of the discreet coordinate sets are retrieved. It should be noted that a user is not required to actually know geospatial latitude and longitudes but that the user can define a location using a device such as a GPS enabled mobile device.

Embodiments of the invention can suggest a set of geospatial coordinates and/or a set of temporal coordinates based upon a user's current or past locations, personal history, general popularity or subject matters. As explained below in more detail, available articles may be limited in either geospatial or temporal coordinates. By suggesting to the user geographic locations and/or temporal set(s), for example by displaying "hot spots" on a map, users can more efficiently view articles of interest. Suggestions can be provided to enable a user to take a tour, or virtual tour of locations of interest. For example, coordinates with associated articles in a battle field, a cemetery or other location, such as the Lewis and Clark trail, can be suggested to a user to accentuate tourism.

In one embodiment, a suggested set of temporal coordinates includes a temporal coordinate component arranged to provide a user interface with a visual representation of the possible set of temporal coordinates. A member of the set of temporal coordinates is illustrated at a corresponding geospatial coordinate in a visual representation of the geospatial coordinates. For example, a graphical representation of Jul. 3, 1863 could be displayed to a user when the user is at or near Cemetery Ridge in Gettysburg, Pa. Likewise, an icon can be presented to represent the user to represent temporal coordinates. In this example, an icon of crossed swords could be used to represent a temporal coordinate set associated with a military battle. As explained below, a similar representation or icon can be used to represent articles.

The identified set of geospatial coordinates can be based on a series of coordinates that represent locations that a user visited. For example, a tourist in Rome could record specific geospatial coordinates of locations visited and the system can use these discreet coordinates to identify a set of geospatial coordinates. Similarly, historic markers are often located along highways where a traveler may not have the ability to stop and research temporal information. By allowing the user to record the GPS coordinates as a point of interest articles corresponding to the geospatial coordinate can be accessed at a later time. For example, the user can record the GPS coordinate as they pass a historic marker and later review associated articles with the historic marker location. In another embodiment, the route traveled can be recorded and a geospatial coordinate set identified therefrom to present articles for at least some historic markers located along the travel route. As such, embodiments of the system are not limited to real time interaction. Similarly, tracking geospatial coordinates of a user can, in one embodiment, be used to identify a set of geospatial coordinates for article retrieval.

As explained above, an article query component 130 can be provided to determine a set of articles based on a set of geospatial coordinates and a set of temporal coordinates. A large temporal coordinate set can be identified, perhaps even the entire temporal dataset. Because this can extend thousands of years the articles may prove too voluminous for practical consumption. As such, embodiments of the invention allow a user to focus on time periods along the z-axis. The end points of one or more time ranges can be selected by a user. Alternatively, preset ranges such as one-hundred years can be presented to a user to select from. For example, the $17^{th}$ century may be of specific interest to a user for an identified geospatial coordinate set. The temporal coordinate sets can include a single contiguous set or multiple discreet sets.

Embodiments of the invention can suggest one or more z-axis temporal coordinate sets based upon available articles for temporal data, personal history, general popularity or subject matters. Available articles may be limited to certain temporal periods. By suggesting to the user set(s) of temporal coordinates, for example by displaying "hot spots" on along the z-axis, users can more efficiently explore articles for the geospatial coordinate set.

In other embodiments, temporal coordinate sets are identified based on suggested subject matter. Further the user can filter the articles by subject matter, author, point-of-view or other criteria. For example, a user can view a temporal coordinate set associated with the American Civil War by selecting a temporal coordinate set of 1861-1865. Articles not associated with the war but which happened in the temporal coordinate set would also be displayed. In one embodiment, therefore, the user can filter the results to just the American Civil War related articles. Further, it may be desired to retrieve only articles from certain qualified authors, such as credentialed historians. The user can also select temporal data from one historical point of view.

The presentation component 140 in one embodiment presents to the user representations of articles determined by the article query component 130. The communication device 150 includes a user interface where representations of articles are displayed. A representation of member(s) of a set of articles can include an icon, link to an article, a thumbnail image, a textual summation, a photo or any other representation for the user. It is noted that articles can be grouped together based on subject matter, for example military and religious. These representations can be a title, icon or other representation of the subject matter. The representation of members of the set of articles can also be a link to the member of the set of articles. The user interface may be arranged to accept metadata from a user and link the metadata to the article. Further, the user interface can be arranged to display an article related to the member of the set of articles by user based criterion. That is, the related article may be outside of the set of articles associated with the geospatial and temporal coordinate sets but of interest to a specific user.

In one embodiment, the set of temporal coordinates identified from a temporal dataset can be the entire temporal dataset. In this embodiment, a user can be presented with representations of articles based on the set of geospatial coordinates and the set of temporal coordinates. The representations may be icons representing groupings of articles, such as by subject matter.

The articles can be provided from different points of view such that biased historical data can be compared. Hyper links to other databases can be displayed to allow a user to further explore data of interest. In a commercial embodiment access to databases with products for sale is provided, such as books or souvenirs. Further, the mobile device can default to a temporal coordinate set corresponding to a current time of use such that a user can explore their current surroundings such as business locations or restaurants.

In one embodiment, a user interface is provided on the communication device that includes a control used to identify the temporal coordinate set such. In one embodiment the control is a sliding scale where a user can select the beginning and ending temporal range. The ends can be actual dates or preset year increments. The granularity of the pre-set increments can be fixed or variable. For example, in rural geospatial locations with limited articles available the granularity of the z-axis ranges may be in 100 year increments. Alternately, in urban geospatial locations with large amounts of articles available the granularity of the z-axis ranges may be in 10 year increments. The z-axis control is not limited to time ranges, but as explained above can select a desired subject corresponding to the geospatial coordinate of the user or POI.

The communication device user interface can also include a geospatial control for identifying the set of geospatial coordinates. In one embodiment the set of geospatial coordinates encompasses all coordinated within a selected geographical distance from the user or POI. In one embodiment the user interface control is a sliding scale where a user can select a distance radius extending from a geospatial coordinate. The granularity of distance increments can be variable based upon the region or article availability. As explained above, the set of geospatial coordinates is not limited to geometric patterns around a point of interest but can be identified by other defined boundaries, such as a city. In this embodiment, geographic boundaries can be displayed on a map for selection by the user. Further, one or more discreet coordinates for the coordinate set can be selected from a displayed map. Suggested hot spots can also be highlighted on a map to assist in identifying the coordinate set.

SUMMARY

A system has been described that includes a geospatial coordinate component arranged to identify a set of geospatial coordinates from a geospatial dataset, a temporal coordinate component arranged to identify a set of temporal coordinates from a temporal dataset, an article query component arranged to determine a set of articles based on the set of geospatial coordinates and the set of temporal coordinates, and a presentation component arranged to present a representation of a member of the set of articles. The geospatial coordinate component can be arranged to receive a user selected geographical area and intersect the geospatial dataset with the geographical area.

The user selected geographical area can include a user selected point-of-interest, where the point-of-interest is located within the geometric shape. The geographical area may be a geometric shape, such as a circle where the point-of-interest is at the center of the geometric shape. A predefined area such as a political entity or a landmark can be defined. The political entity is at least one of a country, state, county, city, or neighborhood, and the landmark is at least one of a natural feature, a building, a campus, or a battlefield.

The temporal coordinate component of the system can be arranged to present a possible set of temporal coordinates. The possible set of temporal coordinates including an intersection of the set of geospatial coordinates and the temporal dataset. The temporal coordinate component receives a user based criterion, and selects temporal coordinates from the possible set of temporal coordinates that match the criterion.

The user based criterion is at least one of a user preference, a user identified interest, an inferred user interest, or a user selected temporal range.

The presentation component can be arranged to provide a user interface including a representation of the member of the set of articles as a link to the member of the set of articles. Further, a user interface can be arranged to display the member of the set of articles. The user interface can be arranged to accept metadata from a user and link the metadata to the article. Also, the presentation component can be arranged to provide a user interface including a visual representation of the possible set of temporal coordinates. A member of the set of temporal coordinates is illustrated at a corresponding geospatial coordinate in a visual representation of the geospatial coordinates.

A machine-readable medium has been described that includes instructions, which when executed by a machine, cause the machine to perform operations comprising identifying a set of geospatial coordinates from a geospatial dataset, identifying a set of temporal coordinates from a temporal dataset, determining, using a hardware processor, a set of articles based on the set of geospatial coordinates and the set of temporal coordinates, and presenting a representation of a member of the set of articles.

A method has been described that comprises identifying a set of geospatial coordinates from a geospatial dataset, identifying a set of temporal coordinates from a temporal dataset, determining, using a hardware processor, a set of articles based on the set of geospatial coordinates and the set of temporal coordinates, and presenting a representation of a member of the set of articles.

While in the foregoing specification this disclosed subject matter has been described in relation to certain preferred embodiments thereof, and many details have been set forth for purposes of illustration, it will be apparent to those skilled in the art that the disclosed subject matter is susceptible to additional embodiments and that certain of the details described herein may be varied considerably without departing from the basic principles of the disclosed subject matter.

While the invention has been described and exemplified in sufficient detail for those skilled in this art to make and use it, various alternatives, modifications, and improvements will be apparent to those skilled in the art without departing from the spirit and scope of the claims.

What is claimed is:

1. A system, comprising:
   a processor coupled to a memory, the memory including instructions which, when executed by the processor, results in the processor causing:
   a geospatial coordinate component of the system to identify a set of geospatial coordinates from a geospatial dataset, wherein to identify the set of geospatial coordinates, the instructions cause the processor to:
   receive a user-selected geographical area to retrieve articles for at least some historic event located within the selected geographical area; and
   intersect the geospatial dataset with the user-selected geographical area;
   a temporal coordinate component of the system to identify a set of temporal coordinates from a temporal dataset;
   a query component of the system to determine, based on the set of geospatial coordinates and the set of temporal coordinates, a temporal set of data that can comprise all of time from the formation of the earth, the temporal set of data including information of historic events that occurred:
  at a location represented by a geospatial coordinate in the set of geospatial coordinates, wherein the set of geospatial coordinates are represented by an x and y axis, and
  during a time included within the set of temporal coordinates, wherein the set of temporal coordinates are represented by a z axis of time granularity; and
a presentation component of the system to present a representation of a member of the temporal set of data to a user interface wherein the user can filter the articles by subject matter, wherein the user interface arranged to accept metadata from the user and link the metadata to the article to grouped together based on the subject matter.

2. The system of claim 1, wherein to receive the user-selected geographical area includes the geospatial coordinate component to receive a user-selected point-of-interest and a geometric shape, the point-of-interest being within the geometric shape.

3. The system of claim 2, wherein to receive the user-selected geographical area includes the geospatial coordinate component to receive a user-selected dimension of the geometric shape.

4. The system of claim 1, wherein to identify the set of temporal coordinates includes the temporal coordinate component to:
  present a possible set of temporal coordinates, the possible set of temporal coordinates including an intersection of the set of geospatial coordinates and the temporal dataset;
  receive a user-based criterion; and
  select temporal coordinates from the possible set of temporal coordinates that match the criterion.

5. The system of claim 4, wherein the user-based criterion is at least one of a user preference, a user-identified interest, an inferred user interest, and a user-selected temporal range.

6. The system of claim 1, wherein to present the representation of the member of the temporal set of data includes the presentation component to present a user interface with the representation of the member of the temporal set of data.

7. A non-transitory machine-readable medium including machine-readable instructions, which when executed by a machine, cause the machine to perform operations comprising:
  identifying a set of geospatial coordinates from a geospatial dataset based on a received user-selected geographical area to retrieve articles for at least some historic event located within the selected geographical area;
  receiving user temporal criteria;
  identifying, based at least in part on the received user temporal criteria, a set of temporal coordinates from a temporal dataset;
  determining, using a hardware processor, a temporal set of data based on the set of geospatial coordinates and the set of temporal coordinates that can comprise all of time from the formation of the earth, the set of temporal data including information of historic events that occurred:
    at a location represented by a geospatial coordinate in the set of geospatial coordinates, wherein the geospatial coordinates are represented by an x and y axis, and
    during a time included within the set of temporal coordinates, wherein the temporal coordinates are represented by a z axis of time granularity; and
  presenting a representation of a member of the temporal set of data to a user interface wherein the user can filter the articles by subject matter, wherein the user interface arranged to accept metadata from the user and link the metadata to the article to grouped together based on the subject matter.

8. The non-transitory machine-readable medium of claim 7, wherein identifying the set of geo spatial coordinates includes receiving a user-selected geographical area and intersecting the geospatial dataset with the user-selected geographical area.

9. The non-transitory machine-readable medium of claim 8, wherein receiving the user-selected geographical area includes receiving a user-selected point-of-interest and a geometric shape, the point-of-interest being within the geometric shape.

10. The non-transitory machine-readable medium of claim 8, wherein receiving the user-selected geographical area includes receiving a user-selected dimension of the geometric shape.

11. The non-transitory machine-readable medium of claim 7, wherein identifying the set of temporal coordinates includes:
  presenting a possible set of temporal coordinates, the possible set of temporal coordinates including an intersection of the set of geospatial coordinates and the temporal dataset;
  receiving a user-based criterion; and
  selecting, from the possible set of temporal coordinates, temporal coordinates that match the user-based criterion.

12. The non-transitory machine-readable medium of claim 11, wherein the user-based criterion is at least one of a user preference, a user-identified interest, an inferred user interest, and a user-selected temporal range.

13. The non-transitory machine-readable medium of claim 7, wherein presenting the representation of the member of the temporal set of data includes providing a user interface with the representation of the member of the temporal set of data.

14. A method comprising:
  identifying a set of geospatial coordinates from a geospatial dataset based on a received user-selected geographical area to retrieve articles for at least some historic event located within the selected geographical area;
  receiving user temporal criteria;
  identifying, based at least in part on the received user temporal criteria, a set of temporal coordinates from a temporal dataset;
  determining, using a hardware processor, a temporal set of data based on the set of geospatial coordinates and the set of temporal coordinates that can comprise all of time from the formation of the earth, the temporal set of data including information of historic events that occurred:
    at a geographic location represented by a geospatial coordinate in the set of geospatial coordinates, wherein the geospatial coordinates are represented by an x and y axis, and
    during a time included within the set of temporal coordinates, wherein the temporal coordinates are represented by a z axis of time granularity; and presenting a representation of a member of the temporal set of data to a user interface wherein the user can filter the articles by subject matter, wherein the user interface arranged to accept metadata from the user and link the metadata to the article to grouped together based on the subject matter.

15. The method of claim 14, wherein identifying the set of geospatial coordinates includes receiving a user-selected geographical area and intersecting the geospatial dataset with the user-selected geographical area.

16. The method of claim 15, wherein receiving the user-selected geographical area includes receiving a user-selected point-of-interest and a geometric shape, the point-of-interest being within the geometric shape.

17. The method of claim 14, wherein identifying the set of temporal coordinates includes:
presenting a possible set of temporal coordinates, the possible set of temporal coordinates including an intersection of the set of geospatial coordinates and the temporal dataset;
receiving a user-based criterion; and
selecting, from the possible set of temporal coordinates, temporal coordinates that match the user-based criterion.

18. The method of claim 17, wherein the user-based criterion is at least one of a user preference, a user-identified interest, an inferred user interest, and user-selected temporal range.

19. The method of claim 14, wherein presenting the possible set of temporal coordinates includes providing a user interface including a visual representation of the possible set of temporal coordinates, a member of the set of temporal coordinates illustrated at a corresponding geospatial coordinate in a visual representation of the geospatial coordinates.

* * * * *

UNITED STATES PATENT AND TRADEMARK OFFICE
CERTIFICATE OF CORRECTION

PATENT NO.       : 10,216,760 B2
APPLICATION NO.  : 15/672911
DATED            : February 26, 2019
INVENTOR(S)      : Russell D. Slifer Page 1 of 1

It is certified that error appears in the above-identified patent and that said Letters Patent is hereby corrected as shown below:

In the Claims

In Column 8, Line 53, in Claim 1, after "wherein", insert --,--

In Column 10, Line 11, in Claim 8, delete "geo spatial" and insert --geospatial-- therefor Signed and Sealed this
Fifth Day of May, 2020

Andrei Iancu
*Director of the United States Patent and Trademark Office*